United States Patent Office 3,574,091
Patented Apr. 6, 1971

3,574,091
CONTINUOUS, LOW PRESSURE CATALYTIC RE-
FORMING PROCESS WITH SULFUR INCLUSION
AND WATER EXCLUSION
John C. Hayes, Palatine, Ill., assignor to Universal Oil
Products Company, Des Plaines, Ill.
No Drawing. Continuation-in-part of application Ser. No.
560,903, June 27, 1966. This application June 24, 1968,
Ser. No. 739,201
Int. Cl. C10g 35/08
U.S. Cl. 208—138                                    10 Claims

ABSTRACT OF THE DISCLOSURE

A hydrocarbon charge stock boiling in the gasoline range is continuously reformed by contacting, in a substantially water-free reforming zone, the hydrocarbon charge stock, hydrogen and sulfur or a sulfur-containing compound with a reforming catalyst containing a platinum group component at reforming conditions including a pressure of about 50 to 350 p.s.i.g. The sulfur or sulfur-containing compound is continuously introduced into the reforming zone, both during start-up and thereafter, in an amount, calculated as elemental sulfur, equivalent to about 300 to about 3000 wt. p.p.m. of the hydrocarbon charge stock. Furthermore, the amount of sulfur or the sulfur-containing compound introduced into the reforming zone is not increased after start-up of the process. Key feature of the resulting process is the ability to continuously operate under this low pressure condition in a stable fashion for a catalyst life of at least 15 barrels of charge per pound of catalyst without catalyst regeneration.

CROSS-REFERENCES TO RELATED
APPLICATIONS

This application is a continuation-in-part of my application Ser. No. 560,903, filed June 27, 1966, now abandoned.

The subject of the present invention is a stable, low pressure process for the continuous catalytic reforming of hydrocarbon charge stocks boiling essentially within the gasoline range. More precisely, the present invention relates to an improved, continuous reforming process for the transformation of charge stocks having low aromatic content, and corresponding low octane number, into those having a substantially higher aromatic content and a high octane number.

The conception of the present invention was facilitated by the recognition that the environment associated with conventional continuous reforming operations using a platinum-containing catalyst can be modified and controlled in such a fashion that an undesired series of degradation reactions can be substantially inhibited with corresponding increase in the efficiency, effectiveness, and stability of the reforming operation. Moreover, this inhibition allows operation of a continuous reforming process at severity levels that had been thought in the past to be commercially impractical; and, in addition, the selectivity of the reforming operation among the complex set of available reactions is further enhanced by the avoidance of esoteric catalyst structural changes that have been found to be unavoidable consequences of the operation of a continuous reforming process in a non-controlled environment. As will be hereinafter explained in detail, the components in the catalytic environment whose concentrations have been found to be critical are sulfur and water. In essence, then, the present invention involves the control of the concentration of sulfur and water in a continuous, low pressure catalytic reforming process in order to minimize the adverse effects of catalyst-degrading side reactions with a concomitant increase in $C_5+$ yield and process stability.

It is well known in the art that the requirements for an optimum process for transforming low octane stocks into high octane stocks, at minimum loss to undesirable products, involves a specially tailored catalytic environment that is designed to promote upgrading reactions for paraffins and naphthenes, which are the components of gasolines and naphthas that have the highest octane-improving potential. For paraffins the upgrading reactions are: isomerization to more highly branched paraffins, dehydrogenation to olefins, dehydrocyclization to aromatics, and hydrocracking to lower molecular weight paraffins. Of these the dehydrocyclization reaction is the one that shows the maximum gain in octane number and is, consequently, preferred. For naphthenes, the principal upgrading reactions involve dehydrogenation to aromatics and ring isomerization and dehydrogenation to aromatics; but, the change in octane number is not as dramatic here as in the case of dehydrocyclization of paraffins since the clear research octane number of most naphthenes is in the range of 65 to 80. Accordingly, catalytic reforming operations are designed to provide an optimum mix between the aforementioned reactions, generally employing for this purpose a multi-purpose catalytic composite having at least a metallic dehydrogenation component and an acid-acting component.

It is not, however, to be assumed that the achievement and control of this optimum mix of upgrading reactions is without its problem areas. These, as is true with any complex set of reaction mechanisms, are injected into the picture by the uncontrollable side phenomena that are produced by a myriad of factors that color and complicate the actual operations of such a reforming process. Foremost among these complicating factors are those associated with undesired side reactions. Examples of these side reactions are: demethylation of hydrocarbons to produce methane, ring opening of naphthenes to give straight chain hydrocarbons, excessive hydrocracking of paraffins to yield light gases (i.e. $C_1$ to $C_4$), condensation of aromatics and other components to form carbonaceous deposits on the catalyst, acid-catalyzed polymerization of olefins and other highly reactive components to yield high molecular weight reactants that can undergo further dehydrogenation and thus contribute to the carboneaceous deposits on the catalyst, etc.

A successful reforming operation, therefore, minimizes the effects of these complicating factors by judicious selection of the catalytic environment and process variables for the particular charge stock of interest. But, adding an additional dimension of complexity to the solution of this problem is the interdependence of the set of desired reactions and the set of undesired reaction such that selection of the proper conditions to minimize undesired reactions has a marked effect on the set of desired reactions.

Nowhere is this interdependence more evident than in a "continuous reforming process." By "continuous reforming process," it is meant a reforming process that is operated for a catalyst life of at least 15 barrels of charge per pound of catalyst (b.p.p.) without regeneration. As is well recognized in the art, continuous reforming processes are sharply distinguishable from "regenerative" reforming processes because in the latter type of process at least a portion of the catalyst is continuously being regenerated and the catalyst life before regeneration is always substantially less than 1 b.p.p. In regenerative reforming, stability is not a problem because of the continuous regeneration capability and the dominating objective in this type of reforming process is selectivity at octane. Because regenerative reforming systems are not directly concerned with minimizing the side reactions that lead to catalyst instability, it is to be understood that the concept of the present invention has no relationship to regenerative reforming. Similarly, the art on regenerative reforming since it is directed at the solution of a different problem has little relevance to continuous reforming systems where the dominating problem is the stability problem. Indeed, it is but a truism to observe that if a regenerative reforming process could be operated in a stable fashion it would cease to require continuous regeneration capability. Hence, the concept of the present invention relates exclusively to continuous reforming systems because in this system it is necessary to suppress undesired side reactions that lead to catalyst deactivation in order to maintain catalyst activity at a high level for a catalyst life of at least 15 b.p.p.

Because regenerative reforming systems need not be concerned about stability, the universal practice has been to run them at low pressure because of well-known short term yield advantages. The term "low pressure" as used herein means about 50 to about 350 p.s.i.g. For some time now, there has been a substantial need for a continuous reforming process that can operate at low pressure without sacrificing either stability or selectivity and I have now found such a process.

At this point, it is to be carefully noted that a low pressure, continuous reforming process is desired because the two main upgrading reactions mentioned previously—dehydrocyclization of paraffins and dehydrogenation of naphthenes—are net producers of hydrogen and as such they are favored by low system pressure.

The principal barrier to low pressure operation in the past has been the effect of low pressure on the previously mentioned catalyst-fouling reactions of condensation and polymerization which are believed to be the principal reactions involved in carbon or coke formation on the catalyst. It is thought that this carbon formation involves in part certain olefinic and aromatic hydrocarbons which appear to be adsorbed on the surface of the reforming catalyst, particularly at the dehydrogenation and aromatization sites, and that these catalytically active sites are thereby shielded from the materials being processed. Moreover, aromatics and olefinic materials in the presence of a reforming catalyst tend to undergo dehydrogenation, condensation and polymerization type reactions and to settle on the catalyst and undergo further dehydrogenation until carbonaceous deposits are formed. Low pressures tend to favor these catalyst fouling reactions, as is hereinafter shown in an example, because insufficient hydrogen is available to suppress these catalyst-fouling reactions which are generally characterized as hydrogen-producers. In addition, a low partial pressure of hydrogen, since it suppresses hydrocracking and hydrogenation tends to allow carbonaceous deposit precursors to collect on the catalyst, whereas ordinarily the high cracking activity and hydrogenation activity of the catalyst would tend to keep the catalyst relatively free of these carbonaceous deposit precursors. In any event, this increase in catalyst-fouling at low pressures results in the decline in catalyst aromatization activity and, if a product of constant quality is desired, it is necessary to compensate for this deactivation. Usually the most direct and inexpensive method for compensating, in a continuous reforming system, involves increasing the reaction temperature. This in turn, however, leads to the promotion of hydrocracking to a greater extent than dehydrogenation and dehydrocyclization reactions. Hence, greater losses to light gases are encountered and hydrogen consumption goes up and $C_5+$ yield goes down. Furthermore, the rate of catalyst fouling increases dramatically as temperature is increased. Accordingly, prior attempts at operating a continuous reforming process at low pressure have been unsuccessful because of this severe stability problem.

I have now discovered that by judicious selection of reforming catalyst environment the reactions associated with reforming catalyst-fouling at low pressure can be inhibited and process stability sharply increased, thereby enabling the successful operation of a continuous reforming process at low pressure. More precisely, I have found that when controlled quantities of sulfur are continuously introduced into the reforming catalyst environment coupled with the substantial exclusion of water therefrom, that the stability of a low pressure, continuous reforming process is extraordinarily improved. Moreover, I have determined that it is essential that sulfur be introduced, not only during start-up but continuously thereafter, and that the level of sulfur introduction not be increased after start-up of the process.

It is to be emphasized at this point, that it is well-known that a reduction in system pressure would tend to promote the desired upgrading reactions; but, in the art of continuous reforming, this had always been found to be commercially impractical and inexpedient because, as previously explained, of the increased rate of carbonaceous deposit formation on the catalyst, with the attendant rapid drop in catalyst activity and product quality leading to rapid increases in severity to compensate for this, with resultant process instability. Therefore, it is not the mere recognition of the desirability of operating a continuous reforming process at low pressure that constitutes the essence of my invention; but, more significantly, the achievement of a reasonably stable operation under these conditions. And it is this stability, which is measured in terms of reaction temperature stability, that is an essenial feature of my invention as will be demonstrated hereinafter in the examples.

It is, accordingly, an object of the present invention to provide a mechanism for inhibiting the formation of carbonaceous deposits on a platinum-containing reforming catalyst during a continuous, low pressure reforming operation. A related objective is to provide a continuous reforming process that is reasonably stable at a pressure of about 50 to about 350 p.s.i.g. while processing a full boiling range gasoline or a selected fraction thereof. Another objective is to provide a stable, low pressure, continuous process for the production of aromatics from naphthenes and/or paraffins at low pressure. Still another objective is to provide a low pressure, continuous reforming process that can operate without regeneration for a catalyst life of at least 15 barrels of charge per pound of catalyst. A further object is to provide a successful low pressure reforming operation that can be built essentially without expensive regeneration facilities, such as swing bed systems.

In a broad embodiment, the present invention consists of a catalytic low pressure process for continuously reforming a hydrocarbon charge stock boiling in the gasoline range for a catalyst life of at least 15 barrels of charge per pound of catalyst without catalyst regeneration. The process involves continuously contacting, in a substantially water-free reforming zone, the hydrocarbon charge stock, hydrogen and sulfur or a sulfur-containing compound with a reforming catalyst containing a platinum group component at reforming conditions including a pressure of about 50 to about 350 p.s.i.g. The sulfur or sulfur-containing compound is continuously introduced into the reforming zone, both during start-up of the process and thereafter in an amount, calculated as elemental sulfur, equivalent to about 300 to about 3000 wt. p.p.m. of the hydrocarbon charge stock. Moreover, the amount of sulfur or sulfur-containing compound entering the reforming zone is not increased after startup of the process.

In another embodiment, the present invention encompasses a process as outlined above wherein the reforming catalyst comprises a refractory inorganic oxide having combined therewith a platinum group component and a halogen component, and wherein the sulfur-containing compound is a mercaptan that enters the reforming zone in admixture with the charge stock.

Another embodiment relates to the process outlined above in the first embodiment wherein the reforming catalyst comprises alumina having combined therewith about 0.01 to about 3.0 wt. percent platinum and about 0.1 to about 1.5 wt. percent chlorine.

Specific objects and embodiments of the present invention relate to details concerning process conditions used therein, particularly preferred catalysts for use therein, types of charge stocks that can be reformed thereby, and mechanics of the reforming step and product recovery steps associated therewith, etc. These specific embodiments and objects will become evident from the following detailed explanation of the essential elements of the present invention.

Without limiting the scope and spirit of the appended claims, by the following explanation, it appears that the observed activity degradation of reforming catalysts is primarily caused by the deposition of carbonaceous deposits on the catalyst. As such, these deposits actively shield the active sites of the catalyst from the reactants with the result that the desired heterogeneous reactions on the surface of the catalyst are substantially inhibited. The chemistry of reactions associated with the formation of these deposits appears to be at least in part the result of complex polymerizaiton and condensation reactions that occur between carbonium ions and hydrocarbon molecules. These carbonium ions are generated as necessary intermediates during the hydrocracking and dehydrogenation reactions which are taking place at the active sites of the catalyst, and they tend to be adsorbed on the surface of the catalyst, if they are not removed at a fast enough rate, acting as precursors for the carbonaceous deposit reaction. Ordinarily, if the partial pressure of hydrogen is high enough, these precursors would in a large measure, be removed by cracking, with attendant saturation by hydrogen or by saturation with hydrogen with attendant displacement from the active sites of the catalyst. But when the hydrogen concentration in the reaction environment is lowered the beneficial effects of these catalyst-fouling prevention reactions tend to be reduced also, and the rate of carbonaceous deposit formation increases markedly. I have now discovered that the presence of controlled amounts of hydrogen sulfide in the reaction environment substantially retards the formation of these carbonaceous deposits. And I believe that the hydrogen sulfide, since it is easily adsorbed by the platinum sites of the catalyst, tends to compete with the coke precursors for the active sites until a situation of dynamic equilibrium develops between the adsorbed hydrogen sulfide and the free hydrogen sulfide in the catalytic environment. I further believe that this hydrogen sulfide dynamic adsorption tends to "sweep" the coke precursors off the catalyst because of the greater affinity of the hydrogen sulfide for the active sites and of the diluent effect of the hydrogen sulfide which is concentrated at the surface of the catalyst. The presence of the hydrogen sulfide in controlled concentration, furthermore, does not appear to substantially affect the dehydrogenation activity of these platinum sites. I have also found that the presence of hydrogen sulfide alone is not adequate. In addition, the catalytic environment must be substantially free from water or compounds that will yield water under the conditions maintained in the reforming zone. This water exclusion requirement is dictated by two observations I have made. The first is that the presence of small amounts of water, especially at low hydrogen partial pressures, tends to promote excessive hydrocracking with its attendant greater production of carbonium ions which, as previously explained, are precursors for the carbonaceous deposit reactions. The second is that the presence of a small amount of water and hydrogen sulfide in the reaction environment will tend to promote undesired metallic crystallite growth which will cut down on the number of available metallic sites associated with the catalyst and, consequently, deactivate the catalyst. I have discovered, therefore, that the presence of controlled concentrations of hydrogen sulfide coupled with the exclusion of water will substantially reduce the observed rate of deactivation of platinum-containing reforming catalyst, and that this beneficial effect is most markedly evident at low pressure.

Before considering in detail the various ramifications of the present invention, it is convenient to define several of the terms and phrases used in the specification and the claims. The phrase "gasoline boiling range" as used herein refers to a temperature range having an upper limit of about 400° F. to about 425° F. The term "naphtha" refers to a selected fraction of a gasoline boiling range distillate and will generally have an initial boiling point of from about 150° F. to about 250° F. and an end boiling point within the range of about 350° F. to about 450° F. The phrase "hydrocarbon charge stock" is intended to refer to a portion of a petroleum crude oil, a mixture of hydrocarbons, of a coal tar distillate, of a shale oil, etc., that boils within a given temperature range. The expressure "sulfur entering the reforming zone" is to be construed to mean the total quantity of equivalent sulfur entering the reforming zone from any source as elemental sulfur or in sulfur-containing compounds. The amounts of sulfur given herein are calculated as weight parts of equivalent sulfur per million weight parts of charge stock (p.p.m.), and are reported on the basis of the element sulfur even though the sulfur is present as a compound. The phrase "substantially water-free" refers to the situation where the total water and water-producing compounds entering the reforming zone from any source is at least less than 10 p.p.m. by weight of equivalent water based on the hydrocarbon charge stock. The term "selectivity" when it is applied to a reforming process refers to the ability of the process to make hydrogen and $C_5+$ yield and to inhibit $C_4-C_1$ yield. The term "activity" when it is applied to reforming process refers to the ability of the process, at a specified severity level, to produce a $C_5+$ product of the required quality as measured by octane number. The term "stability" when it is applied to the reforming process refers to the rate of change with time of the operating parameters associated with the process; for instance a common measure of stability is the rate of change of reactor temperature that is required to maintain a constant octane number in output $C_5+$ product—the smaller slope implying the more stable process. The "liquid hourly space velocity" (LHSV) is defined to be the equivalent liquid volume of the charge stock flowing through the bed of catalyst per hour divided by the volume of the reforming zone containing catalyst.

The hydrocarbon charge stock that is reformed in accordance with the process of the present invention is generally a hydrocarbon fraction containing naphthenes and paraffins. The preferred charge stocks are those consisting essentially of naphthenes and paraffins although in some cases aromatics and/or olefins may also be present. This preferred class includes straight run gasolines, natural gasolines, synthetic gasolines, and the like. On the other hand, it is frequently advantageous to charge thermally or catalytically cracked gasolines or higher boiling fractions thereof. Mixtures of straight run and cracked gasoline can also be used. The gasoline charge stock may be a full boiling range gasoline having an initial boiling point of from about 50° F. to about 100° F. and an end boiling point within the range of from about 325 to 425° F., or may be a selected fraction thereof which usually will be a higher boiling fraction commonly referred to as a heavy naphtha. It is also within the scope of the present invention to charge pure hydrocarbons or mixtures of hydrocarbons, usually paraffins or naphthenes, which it is desired to convert to aromatics.

The charge stock must be carefully controlled in the areas of concentration of sulfur-containing compounds and of concentration of oxygen-containing compounds. In general, it is preferred that the concentration of both of these constituents be reduced to very low levels (that is, less than 10 p.p.m. calculated as water or sulfur respectively) by any suitable pretreating method such as a mild hydrogenation treatment with a suitable support catalyst such as a cobalt and/or molybdenum catalyst. This is not to be construed to exclude the possibility that the concentration of sulfur-containing compounds in the charge stock could be carefully adjusted in order to furnish the required amount of sulfur to the reactions environment; but this latter method is difficult to control and is, consequently, not preferred. In any event, it is necessary that the total concentrations of water and of water-yielding compounds be reduced to at least 10 p.p.m. calculated as equivalent water and preferably substantially less than this.

In general, it is preferred to first reduce the sulfur and oxygen concentration of the feed to very low levels, and thereafter inject into the reforming zone a controlled amount of sulfur or sulfur-containing compound. Any reducible sulfur-containing compound, that does not contain oxygen, which is converted to hydrogen sulfide by reaction with hydrogen at the conditions in the reforming zone may be used. This class includes: aliphatic mercaptans such as ethyl mercaptan, propyl mercaptans, tertiary butyl mercaptan, etc.; aromatic mercaptans such as thiophenol and derivatives; cycloalkane mercaptans such as cyclohexyl mercaptan; aliphatic sulfides such as ethyl sulfides; aromatic sulfides such as phenyl sulfide; aliphatic disulfides such as tertiary butyl disulfide; aromatic disulfides such as phenyl disulfide; dithioacids; thioaldehydes; thioketones; heterocyclic sulfur compound such as the thiophenes and thiophanes; etc. In addition, free sulfur or hydrogen sulfide may be used if desired. Usually, a mercaptan such as tertiary butyl mercaptan is the preferred additive for reasons of cost and convenience.

Regardless of which sulfur additive is used, it is clear that it may be added directly to the reforming zone independently of any input stream, or that it may be added to either the charge stock or the hydrogen stream or both of these. For example, one acceptable method would involve the addition of hydrogen sulfide to the hydrogen stream. However, the preferred procedure involves the admixture of the sulfur additive with the charge stock prior to its passage into the reforming zone.

The amount of sulfur entering the reforming zone at any given time is a function of residual sulfur in the charge stock, the amount of sulfur added to the charge stock, the amount of sulfur in the hydrogen stream, and the amount added directly to the zone. Regardless of the source of the sulfur entering the reforming zone, it is an essential feature of the present invention that the total from all sources must be continuously maintained in the range of about 300 p.p.m. to about 3000 p.p.m. based on weight of charge stock entering the reforming zone, and preferably about 500 to 1500 wt. p.p.m.

Furthermore, I have determined that it is essential that the sulfur be present during start-up of the process and that the sulfur be continuously introduced in the amount given above for the duration of the reforming run. More particularly, if the process is started-up and lined-out and then sulfur is added, the results will be negative. Likewise, if sulfur introduction is discontinued during the course of the run and then later reintroduced, the process will not recover—that is the sulfur effect is not reversible. In short, the continuous presence of sulfur in a low pressure, continuous reforming system is absolutely essential to prevent rapid and irreversible catalyst deactivation.

Another essential limitation associated with the use of sulfur is that the amount of sulfur entering the reforming zone must not be increased during the course of the run because I have observed that if this happens the catalyst will quickly deactivate and will not respond to a subsequent reduction in the amount of sulfur entering the reforming zone. Hence, it is an essential feature of the present invention that the amount of sulfur entering the reforming zone is lined-out during start-up at a value within the range previously given and thereafter never increased above this level.

As hereinbefore indicated, the reforming catalyst contains a platinum group component. Typically this component is combined with a suitable refractory inorganic oxide carrier material such as alumina, silica, zirconia, magnesia, boria, thoria, titania, strontia, etc., and mixtures of two or more including silica-alumina, alumina-boria, silica-alumina-zirconia, etc. It is understood that these refractory inorganic oxides may be manufactured by any suitable method including separate, successive, or co-precipitation methods of manufacture, or they may be naturally-occurring substances such as clays, or earths which may or may not be purified or activated with special treatment. The preferred carrier material comprises a porous, adsorptive, high surface area alumina support having a surface area of about 25 to 500 or more $m.^2/gm.$ Suitable alumina materials are the crystalline aluminas known as gamma-, eta-, and theta-alumina, with gamma-alumina giving best results. In addition, in some embodiments the preferred alumina carrier material may contain minor proportions of other well-known refractory inorganic oxides such as silica, zirconia, magnesia, etc. However, the preferred carrier material is substantially pure gamma-alumina. In fact, an especially preferred carrier material has an apparent bulk density of about 0.30 to about 0.70 gm./cc. and has surface area characteristics such that the average pore diameter is about 20 to about 300 angstroms, the pore volume is about 0.10 to about 1.0 ml./gm. and the surface area is about 100 to about 500 $m.^2/gm.$ A preferred method for manufacturing this alumina carrier material is given in U.S. Pat. No. 2,620,314.

Another typical constituent of the reforming catalyst is a halogen component. Although the precise form of the chemistry of the association of the halogen component with the aluminum carrier material is not entirely known, it is customary in the art to refer to the halogen component as being combined with the alumina or with the other ingredients of the catalyst. This combined halogen may be either fluorine, chlorine, iodine, bromine, or mixtures thereof. Of these, fluorine and chlorine are preferred for the purposes of the present invention. The halogen may be added to the alumina support in any suitable manner, either before during, or after the addition of the other components. For example, the halogen may be added as an aqueous solution of an acid such as hydrogen fluoride, hydrogen chloride, hydrogen bromide, etc. In addition, the halogen or a portion thereof may be composited with the alumina during the impregnation of the latter with the platinum group component; for example, through the utilization of a mixture of chloroplatinic acid and hydrogen chloride. In another situation, the alumina hydrosol which is typically utilized to form the alumina carrier material may contribute at least a portion of the halogen component to the final composite. In any event, the halogen will be typically composited in such a manner as to result in a final composite containing about 0.1 to about 1.5 wt. percent and preferably about 0.4 to about 1.0 wt. percent of halogen calculated on an elemental basis.

As indicated above, the reforming catalyst must contain a platinum group component. Although the preferred catalyst contains platinum or a compound of platinum, it is intended to include other platinum group metals such as palladium, rhodium, ruthenium, etc. The platinum group metallic component, such as platinum may exist within the final catalytic composite as a compound such as an oxide, sulfide, halide, etc., or as an elemental state. Generally, the amount of the platinum group metallic component present in the final catalyst is small compared to the quantities of the other components combined therewith. In fact, the platinum group metallic component generally comprises about 0.01 to about 3 wt. percent of the final catalyst calculated on an elemental basis. Excellent results are obtained when the catalyst contains about 0.1 to about 2.0 wt. percent of the platinum group metal.

The plainum group component may be incorporated in the catalytic composite in any suitable manner such as coprecipitation or cogellation with the alumina support, ion-exchange with the alumina support and/or alumina hydrogel, or impregnation of the alumina support at any stage in its preparation either before, during, or after its calcination treatment. The preferred method of preparing the catalyst involves the utilization of water soluble compounds of the platinum group metals to impregnate the alumina support. Thus, the platinum group metal may be added to the alumina support by commingling the latter with an aqueous solution of chloroplatinic acid.

Following the platinum and halogen impregnation, the impregnated alumina carrier material is typically dried and subjected to a conventional high temperature calcination or oxidation technique to obtain an oxidized composite of a halogen component and a platinum group component with an alumina carrier material. Similarly, additional treatments such as reduction and/or presulfiding may be performed on the resulting oxidized composite if desired.

It is understood that the reforming catalyst may be manufactured in any suitable manner and that the precise method of manufacture is not considered to be a limiting feature of the present invention. Likewise, it is understood that the catalyst may be present in any desired shape, such as: spheres, pills, pellets, extrudates, powder, etc. Additional details on one preferred catalyst for the process of the present invention are given in U.S. Patent 2,479,109 issued to Vladimir Haensel.

According to the present invention, the hydrocarbon charge stock, hydrogen, and sulfur or a sulfur-containing compound are contacted in a substantially water-free reforming zone with a reforming catalyst containing a platinum group component at reforming conditions. This reforming step may be accomplished in a fixed bed system, a moving bed system, a fluidized system, or in a batch type operation; however, in view of the danger of the attrition losses of the valuable catalyst and of well-known operational advantages, it is preferred to use a fixed bed system. In this system, a hydrogen-rich stream and the charge stock are preheated, by any suitable heating means, to the desired reaction temperature and then are passed in admixture with sulfur or a sulfur-containing compound, into a reforming zone containing a fixed bed of the catalyst. It is, of course, understood that the reforming zone may be one or more separate reactors with suitable heating means therebetween to insure that the desired conversion temperature is maintained at the entrance to each reactor. It is also to be noted that the reactants are typically in vapor phase and may be contacted with the catalyst bed in either upward, downward, or radial flow fashion with the latter being preferred.

It is an essential feature of the present invention that the reforming zone is maintained substantially water-free. To achieve and maintain this condition, it is necessary to control the water initially present in the reforming zone and the water level present in the charge stock and the hydrogen stream which are charged to the reforming zone. It is essential that the equivalent water entering the reforming zone from all sources be held to a level less than that equal to 10 wt. p.p.m. In general, this can be accomplished by predrying the reforming zone with a suitable circulating dry gas such as dry hydrogen, and by continuously drying the charge stock with any suitable drying means known to the art such as a conventional solid adsorbent having a high selectivity for water, for instance, silica gel, activated alumina, calcium or sodium crystalline aluminosilicates, anhydrous calcium sulfate, high surface area sodium, and the like adsorbents. Similarly, the water content of the charge stock may be adjusted by suitable stripping operations in a fractionation column or like device. And in some cases a combination of adsorbent drying and distillation drying may be used advantageously to effect almost total removal of water from the charge stock. Additionally, it is preferred to continuously dry the hydrogen stream entering the hydrocarbon conversion zone down to a level of about 10 volume p.p.m. of water or less. This can be conveniently accomplished by contacting the hydrogen stream with any suitable adsorbent such as the ones mentioned above. The preferred drying means for both charge stock and the hydrogen stream is calcium aluminosilicate molecular sieves having a pore size of about 5 angstroms.

Regardless of the details of the operation of the reforming step, an effluent stream is continuously withdrawn from the reforming zone, cooled in a conventional cooling means and typically passed to a separating zone wherein a hydrogen-rich vapor phase separates from a hydrocarbon-rich liquid phase. A hydrogen-rich stream is then withdrawn from the separating zone and a portion of it vented from the system in order to remove the net hydrogen production and to maintain pressure control. Typically another portion of this withdrawn hydrogen stream is recycled via compressing means to the reforming step. Similarly, the hydrocarbon-rich liquid phase is withdrawn and typically passed to a suitable fractionation zone wherein a $C_1$ to $C_4$ product is taken overhead and a $C_5+$ product recovered as bottoms.

It is within the scope of the present invention to operate with a once-through hydrogen stream, but the preferred procedure is to recycle a hydrogen stream recovered from the effluent stream as indicated above. In this last mode, the recycle hydrogen stream can be selectively treated to remove $H_2O$ without removing $H_2S$ by using a suitable selective adsorbent (e.g. see U.S. Pat. No. 3,201,343); however, this procedure requires the calculation of the equilibrium level of sulfur that will enter the reforming zone with the hydrogen stream for a given sulfur input in the charge stock so that the total quantity of sulfur entering the reforming zone, in both the charge stock and hydrogen stream, is lined-out at a value in the range previously given. An alternative approach which is simpler to control is to remove substantially all $H_2O$ and $H_2S$ from the recycle hydrogen stream and control the amount of sulfur entering the reforming zone exclusively by the amount admixed with the charge stock.

As indicated previously, a singular feature of the process of the present invention is the capability to operate in a stable fashion at low pressure. In the past, it has been the practice to operate at high pressure primarily to provide sufficient hydrogen to saturate hydrocarbon fragments generated during the reforming process and to prevent excessive carbon deposition on the catalyst with the attendant decline in the catalyst's activity for the upgrading reactions of interest. I have now found that a stable operation is achieved using the catalyst and process of the present invention at pressures in the range of about 50 to about 350 p.s.i.g. and preferably about 75 to about 300 p.s.i.g. The exact selection of the operating pressure within these ranges is made primarily as a function of the characteristics of the particular charge stock and catalyst used in the process.

The temperature required in the reforming zone is generally lower than that required for a similar high pressure operation. This significant and desired feature is a consequence of the inherent selectivity of the low-pressure operation for the octane-upgrading reactions as previously explained. In the past, when high-octane was required, it was the practice to run at higher temperatures in order to produce more hydrocracking of paraffins and thus concentrate the available aromatics in the product stream. The present process requires a temperature in the range of about 800° F. to about 1100° F. and preferably about 850° F. to about 1050° F.

The process is operated at a liquid hourly space velocity in the range of about 0.5 to about 15.0 hr.$^{-1}$ and preferably in the range of about 1.0 to about 5.0 hr.$^{-1}$. Furthermore, the amount of hydrogen-rich gas charged along with the hydrocarbon stream is from about 0.5 to about 20 moles of hydrogen per mole of hydrocarbon, and preferably from about 4 to about 12 moles of hydrogen per mole of hydrocarbon.

An extraordinary feature of the process of the present invention is the infrequency with which the catalyst must be regenerated. Previously, low pressure operations have required extensive regenerating facilities if the associated catalyst is to be used for an economic period of time. The process of the present invention, since it operates for at least a catalyst life of 15 b.p.p. and more typically, 25 b.p.p. to 100 b.p.p., without any regeneration can be built without extensive regenerating facilities, such as swing bed reactors, thereby effecting great savings in initial investment. For example, for a typical reforming catalyst having an apparent bulk density of about 32 lb./cu. ft., the improved process of the present invention would operate, for a minimum catalyst life of at least 15 b.p.p., which at a typical LHSV of 1 hr.$^{-1}$ corresponds to 3.7 months before any regeneration of the catalyst would be required; and depending on the charge stock and severity level utilized, it would more typically operate for a catalyst life of about 25 b.p.p. to about 100 b.p.p. which at a LHSV of 1 hr.$^{-1}$ corresponds to a catalyst life of about 6.15 months to about 24.6 months without any regeneration of the catalyst. An additional incentive for avoiding frequent regeneration is the substantial danger of injecting small amounts of water into the system from the regeneration operation via inefficient purging techniques once the oxidation step of the regeneration cycle is completed. As previously discussed, the presence of even small quantities of water in the system can jeopardize the stability of the process; accordingly, stringent precaution must be taken to insure that the reforming zone is substantially free from water after its infrequent regeneration operations are performed.

The following examples are given to illustrate further the process of the present invention and to indicate the benefits to be afforded through the utilization thereof. It is understood that the examples are given for the sole purpose of illustration, and are not considered to limit unduly the generally broad scope and spirit of the claims.

EXAMPLE I

This example shows the effect of pressure reduction on the processing of a light Kuwait naphtha.

A catalyst was prepared utilizing 1/16-inch alumina spheres, manufactured in accordance with U.S. Patent No. 2,620,314. The spheres were then impregnated with an aqueous solution of chloroplatinic acid and hydrogen chloride. The impregnated spheres were then dried and thereafter subjected to high temperature oxidation. The catalytic composite was then subjected to a high temperature reduction treatment in an atmosphere of hydrogen. This reduction treatment was followed by a high-temperature sulfiding treatment with hydrogen sulfide. The resultant catalytic composite contained 0.75% by weight of platinum, 0.90% by weight of chloride, and about 0.10% by weight of sulfur, all calculated on an elemental basis.

The charge stock for this example was a light Kuwait naphtha having the properties shown in Table I.

TABLE I.—LIGHT KUWAIT NAPHTHA

| | |
|---|---|
| Gravity, API at 60° F. | 64.0 |
| 100 ml. ASTM distillation, ° F. | |
| Initial boiling point | 175 |
| 5% | 187 |
| 10% | 193 |
| 30% | 204 |
| 50% | 218 |
| 70% | 234 |
| 90% | 251 |
| 95% | 259 |
| End boiling point, ° F. | 275 |
| Sulfur, parts per million (p.p.m.) | 1.6 |
| Nitrogen, p.p.m. | 0.79 |
| Water, p.p.m. | <2 |
| Octane number, F-1 clear | 50.4 |
| Octane number, F-1+3 cc. TEL | 73.8 |
| Volume percent paraffins | 74.0 |
| Volume percent naphthenes | 19.0 |
| Volume percent aromatics | 7.0 |

The charge stock was then subjected to a series of accelerated activity-stability tests which comprised: passing the stock over a fresh load of 100 cc. of the aforementioned catalyst at a LHSV of 1.5 hr.$^{-1}$ and a mol ratio of 12 moles of total recycle gas per mol of hydrocarbon charge. The test period was six days. The target octane was 100 F-1 clear and the conversion temperature was adjusted constantly during the tests to meet this output requirement.

The tests were conducted in a reforming plant comprising a single reforming zone, a separating zone, and a debutanizer column. The effluent from the reforming zone was cooled and passed to a separating zone maintained at the same pressure as in the reforming zone but at a temperature of about 55° F. A portion of the hydrogen-rich vapor phase withdrawn from the separating zone was recycled to the reforming zone in order to supply necessary hydrogen and to maintain pressure therein; the excess vapor phase from the separating zone was separately recovered as excess separator gas. The liquid phase from the separating zone was passed to a debutanizer column in which the light ends (i.e. hydrocarbons in the range of $C_1$ to $C_4$) were removed overhead. The $C_5+$ bottoms product from the debutanizer was separately recovered and analyzed.

Results of this series of tests are shown in Table II.

TABLE II.—SUMMARY OF PRESSURE VARIATION RUNS

| Plant pressure, p.s.i.g. | Temp. ° F. | DOH/TOT gas ratio | $C_5+$ vol. percent yield | Percent $H_2$ in recycle | Vol. percent aromatics in product (based on charge) |
|---|---|---|---|---|---|
| 300 | 998.5 | .176 | 66.9 | 74.6 | 45.4 |
| 200 | 991.5 | .108 | 70.5 | 80.3 | 48.4 |
| 150 | 987 | .078 | 72.3 | 81.4 | 50.7 |
| 100 | 983 | .053 | 73.2 | 82.6 | 50.3 |

Table II shows the results that were obtained at the end of the fourth day for each of the tests. Definitions of the terms employed in Table II are as follows:

(A) DOH/TOT gas ratio is the ratio of the volume of overhead gas from the debutanizer column to that of the total gas (excess separator gas+debutanizer overhead gas) produced from the plant. It is indicative of the relative yield of undesired light products (i.e. $C_1$–$C_4$) from the reaction, especially when coupled with recycle hydrogen purity data.

(B) $C_5+$ vol. percent Yield is the vol. percent of original charge recovered as the bottoms from the debutanizer column.

(C) Percent $H_2$ in Recycle is the mol. percent hydrogen in the recycle hydrogen stream.

(D) Vol. percent Aromatics is the vol. percent of charge stock recovered as aromatics in the $C_5+$ product stream.

From Table II, therefore, it can be seen that a reduction in process pressure caused the following to occur:

(A) As the pressure was reduced DOH/TOT gas ratio fell and the purity of the recycle hydrogen stream increased, indicating that there was a substantial reduction in undesired hydrocracking to light gases.

(B) The reduction in undesired hydrocracking was paralleled by an increase in $C_5+$ volume percent yield.

(C) The reduction in undesired hydrocracking was accompanied by an increase in the preferred upgrading reactions as is demonstrated by the volume percent aromatics data.

It is also to be noted that the reduction in pressure was accompanied by a significant decrease in the reactor temperature to reach the target octane level at the end of four days. In view of the sharp dependence of the hydrocracking reaction on temperature, this was an additional factor tending to minimize undesired hydrocracking.

In line with the previous discussion, the attainment of these remarkable results was not without its attendant detriments. This is illustrated in Table III. As can be seen from the table, the reduction in pressure is accompanied by an increase in temperature and yield instability.

TABLE III.—TEMPERATURE STABILITY DATA

| Plant pressure | Temperature requirement ° F. | | | $C_5+$ vol. percent yield | | |
|---|---|---|---|---|---|---|
| | 1st day | 6th day | ΔT | 1st day | 6th day | Δ yield |
| 300 | 980 | 1,000 | +20 | 68.5 | 65.9 | −2.6 |
| 200 | 973.5 | 994.5 | +21 | 71.7 | 69.2 | −2.5 |
| 150 | 968 | 994 | +26 | 74.6 | 70.4 | −4. |
| 100 | 962.5 | 992.5 | +30 | 77.4 | 72.4 | −5.2 |

This data then illustrates the very substantial yield-octane improvement that may be made by reducing pressure in order to suppress hydrocracking and promote aromatization. It also highlights the counterbalancing stability problem that has to be overcome in order to fully utilize these advantages.

TABLE IV—PROPERTIES OF LIGHT KUWAIT NAPHTHA 100 ml. ASTM Distillations ° F.

| | |
|---|---|
| Initial boiling point | 180 |
| 5% | 194 |
| 10% | 198 |
| 30% | 206 |
| 50% | 214 |
| 70% | 224 |
| 90% | 243 |
| 95% | 255 |
| End boiling point ° F. | 304 |
| Sulfur, p.p.m. | 0.2 |
| Nitrogen, p.p.m. | 0.1 |
| Water, p.p.m. | <1 |
| Paraffins vol. percent | 76 |
| Olefins vol. percent | <1 |
| Naphthenes | 18 |
| Aromatics | 6 |

The purpose of this series of tests was to study the effects of water( added to the charge stock as tertiary butyl alcohol) on the reforming of the naphtha charge stock in the presence of 10 wt. p.p.m. of sulfur (added to the charge stock as tertiary heptyl mercaptan). The results of this series of runs are shown in Table V.

This data is reported in terms of block temperature and $C_5+$ vol. percent of charge stock (i.e. yield, pentanes and heavier) at the end of the first 24 hours (designated as initial period reading in the table) and at the end of the 144 hour test. It is to be noted that Runs 1 and 3 were terminated prematurely because of excessive deactivation and, consequently, the data for these runs is given in terms of the reading obtained just before the run was aborted. Runs 4 and 5 represent similar condition runs with the sole exception that in Run 5, 2 wt. p.p.m. of chloride was added to the charge stock. Run 5 represents a control run that was performed with sulfur addition.

TABLE V.—RESULTS OF WATER ADDITION TESTS

| Run No.: | $H_2O$ added, wt. p.p.m. | S added, p.p.m. | Initial block, temp. ° F. | Final block, temp. ° F. | ΔT | Initial $C_5+$vol. percent yield | Final $C_5+$vol. percent yield | Δ yield |
|---|---|---|---|---|---|---|---|---|
| 1 | 500 | 10 | 960 | >1,040 | >80 | 68.5 | <56.5 | <−12.0 |
| 2 | 250 | 10 | 962 | >1,030 | >68 | 65.5 | <57.0 | <−8.5 |
| 3 | 100 | 10 | 954 | ¹1,010 | 56 | 70.0 | ¹65.5 | −4.5 |
| 4 | 100 | 10 | 950 | ¹1,018 | 68 | 71.5 | ¹64.0 | −7.5 |
| 5 | 0 | 10 | 958 | 1,002 | 44 | ¹73.5 | 69.0 | −4.5 |
| 6 | 0 | 2 | 957 | 1,004 | 47 | ¹70.4 | 66.4 | −4.0 |

¹ Indicates that data was extrapolated in order to normalize with respect to time.
> Indicates that actual reading was substantially greater than that shown.
< Indicates that actual reading was substantially less than that shown.

EXAMPLE II

This example demonstrates one detrimental aspect of the presence of water in the reforming environment of the present invention.

A resulfurized Kuwait straight run naphtha, having properties as shown in Table IV, was reformed over a catalyst having the same composition and prepared in the same manner as the catalyst in Example I. The processing conditions were: a pressure of 100 p.s.i.g., an LHSV of 1.5 hr.⁻¹, and a mol ratio of hydrogen to hydrocarbon charge of 7.5:1. The operating temperature was selected throughout the runs in order to maintain an octane rating on the debutanized liquid product of 100 F-1 clear.

The flow scheme was essentially the same as that outlined in Example I except that high-surface area sodium scrubbers were added to the recycle hydrogen loop in order to remove substantially all of the hydrogen sulfide and water from the recycle hydrogen stream.

As can be seen from Table V, the presence of water in the catalytic environment is detrimental to the process both in terms of temperature stability and a yield stability. It is also to be observed that the magnitudes of the yield curves are significantly lower for the water runs than for the essentially water-free runs (i.e. Runs 5 and 6). This indicates excessive production of light gases via undesired hydrocracking when water is present with hydrogen sulfide in the catalytic environment. The temperature differentials, likewise, confirm the predicted instability for a reforming operation in the presence of water and hydrogen sulfide.

It is readily ascertained from the data for Run 5, that the exclusion of water from the catalytic environment increased both temperature stability and yield stability. In addition, on Runs 5 and 6 the carbon deposited on the catalyst at the end of the test period was measured and found to be 4.07% by weight for the catalyst used in Run 5 and 4.26% by weight for Run 6. This difference of 0.19% produced by the higher sulfur concentration is indicative of a general tendency of the process of the present invention to decrease the rate of formation of carbonaceous deposits on the catalyst.

EXAMPLE III

This example shows the effects of varying the amount of sulfur continuously injected into the reforming zone.

For this series of runs, the charge stock, the flow scheme, and the catalyst composition were all kept substantially constant in order to study the effects of continuously injecting various amounts of sulfur, based on weight of naphtha charge, into the reforming environment. Water was carefully excluded from the feed and extensive provisions were taken to dry the plant before this series was started in order that this series might be conducted in an essentially water-free environment.

The charge stock, flow scheme, process parameter, and catalyst composition and preparation were identical with those previously set out in Example II with the exception that in Run 6 the catalyst only contained 0.60% by weight of chloride. Once again the operating temperature was selected throughout the test period of 144 hours, in order to maintain an octane rating in the debutanized liquid product of 100 F-1 clear.

The results of the runs are summarized in Table VI. These results can be correlated in terms of temperature stability and yield stability for the period of interest. It is to be emphasized that temperature stability is the more important parameter insofar as catalyst life is concerned because of the marked increase in carbon deposition rates at higher temperatures as previously explained. As can be seen from Table VI, the temperature differential between the end of the first period and the final period shows a remarkable decline as the concentration of hydrogen sulfide in the catalytic environment is increased and is sharply reduced at a sulfur level corresponding to 300 p.p.m. or more. It is to be emphasized that since the recycle hydrogen gas is scrubbed free of $H_2O$ and $H_2S$, essentially all of the hydrogen sulfide comes from the sulfur added to the naphtha feed.

From Table VI it can also be determined that the increase in stability of the reaction temperature was paralleled by an upward shift in the yield curve and by an increase in stability of the yield curve. For instance when the concentration of sulfur in the feed was changed from 2 p.p.m. to 1200 p.p.m. the temperature differential over the process period dropped from 47° F. to 15° F., the yield differential dropped from −4.0 to −1.9 and, most significantly, the yield curve shifted upward approximately 2 to 4 percentage points based on volume of input charge stock. This data then clearly demonstrates the increased stability associated with the present invention.

Table VI also manifests another beneficial characteristic of the present invention. It is the decrease in the rate of carbon deposition as the concentration of sulfur in the feed is increased. As can be ascertained from the table, the wt. percent carbon on the catalyst after the 144 hour run steadily decreased as the sulfur level was increased; for example, at 2 p.p.m. sulfur, the carbon was 4.26% by weight of the catalyst, and 1200 p.p.m. sulfur, the carbon was down to 1.86%.

EXAMPLE IV

A desulfurized, straight-run naphtha having the properties shown in Table VII was subjected to a pilot plant scale, stability test by continuously charging this stock to a reforming zone containing a catalyst comprising alumina, about 0.75 wt. percent platinum, about 0.90 wt. percent chloride, and about 0.10 wt. percent sulfur. The catalyst was manufactured according to the method given in Example I.

TABLE VII—ANALYSIS OF STRAIGHT-RUN NAPHTHA

| | |
|---|---|
| Gravity, ° API at 60° F. | 56.1 |
| Engler distillation: | |
| IBP, ° F. | 203 |
| 10% | 226 |
| 30% | 244 |
| 50% | 264 |
| 70% | 293 |
| 90% | 350 |
| EBP, ° F. | 368 |
| Sufur, wt. p.p.m. | 0.1 |
| Water, wt. p.p.m. | 2.5 |
| Paraffins, vol. percent | 46 |
| Naphthenes, vol. percent | 48 |
| Aromatics, vol. percent | 6 |
| Octane No., F-1 clear | 46.0 |

The flow scheme utilized was essentially the same as that described in Example I with the exceptions that the charge stock was dried with a high-surface area sodium scrubber and that the hydrogen recycle stream was dried with a 13X mole sieve drier that had been presaturated with hydrogen sulfide, according to the method given in U.S. Pat. No. 3,201,343. In view of this presaturation, the drier had a high selectivity for water with relatively little capability for removing $H_2S$, and the concentration of $H_2S$ was allowed to build to an equilibrium level in this recycle hydrogen stream. Moreover, before this reforming plant was start-up, it was dried by circulating hot hydrogen gas through a molecular sieve drier at 400 p.s.i.g.

Tertiary heptyl mercaptan was added to the naphtha charge stock in an amount of about 200 wt. p.p.m., calculated as equivalent sulfur, and for this plant, operated with recycle hydrogen in an amount sufficient to provide a hydrogen to hydrocarbon ratio of about 8:1, this is equivalent to a total sulfur input into the reforming zone of about 1000 wt. p.p.m., based on weight of naphtha charge because of the sulfur present in the hydrogen recycle stream.

The reforming process was conducted at the following conditions: a pressure of 200 p.s.i.g., a LHSV of 2.0 hr.$^{-1}$, and a hydrogen to hydrocarbon mole ratio of about 8:1. In addition, the reactor temperature was continuously adjusted in order to maintain the $C_5+$ output product at an octane number of 100 F-1 clear.

The process was run for a process period corresponding to a catalyst life of 7.0 barrels per pound with the results shown in Table VIII. It is understood that the run was terminated at this catalyst life not because the catalyst needed regeneration but because the stability data

TABLE VI.—RESULTS OF S LEVEL VARIATION

| | S added, wt. p.p.m. | Initial block, temp. ° F. | Final block, temp. ° F. | Δ T | Initial[1] $C_5+$vol. percent yield | Final $C_5+$vol. percent yield | Δ yield | Wt. percent carbon on catalyst |
|---|---|---|---|---|---|---|---|---|
| Run No.: | | | | | | | | |
| 1 | 2 | 957 | 1,004 | 47 | [2] 70.4 | 66.4 | −4.0 | 4.26 |
| 2 | 10 | 958 | 1,002 | 44 | [2] 73.5 | 69.0 | −4.5 | 4.08 |
| 3 | 50 | 959 | 1,007 | 48 | [2] 73.5 | 69.1 | −4.4 | 4.23 |
| 4 | 100 | 957 | 999 | 42 | [2] 74.5 | 70.2 | −4.3 | 3.91 |
| 5 | 300 | 956 | 980 | 24 | [2] 70.8 | 71.6 | +0.8 | 2.47 |
| 6 | 600 | 960 | 980 | 20 | [2] 73.6 | 71.3 | −2.3 | 2.20 |
| 7 | 1,200 | 956 | 971 | 15 | [2] 73.0 | 71.1 | −1.9 | 1.86 |
| 8 | 2,400 | 944 | 960 | 16 | 71.0 | 69.0 | −2.0 | 1.81 |

[1] Yield data based on vol. percent of charge stock.
[2] Indicates data was extrapolated in order to normalize with respect to time.

desired was obtained, and it was not necessary to tie up the plant for any longer period. In commercial practice, this run would have been allowed to continue for a catalyst life substantially greater than 15 b.p.p.

TABLE VIII.—RESULTS OF STABILITY TEST

| | Average yield | Δ yield/b.p.p. |
|---|---|---|
| $C_5+$, LV percent | 80.3 | −0.50 |
| $C_6+$, LV percent | 76.5 | −0.70 |
| Aromatics, LV percent | 56.7 | −0.25 |
| Hydrogen, s.c.f.b | 1,407 | −14.3 |
| $C_3+C_4$, wt. percent | 6.07 | +0.15 |
| $C_1+C_2$, wt. percent | 4.24 | +0.22 |

From Table VIII it can be seen that the $C_5+$ liquid volume yield based on charge stock for this run averaged about 80.3, and even more surprisingly, it was declining at the average rate of −0.50 vol. percent b.p.p., which is indicative of the stability feature of the present invention. Moreover, the average deactivation rate of this catalyst over this extender period was about 5.0° F./b.p.p. This temperature deactivation rate stands in sharp contrast to that observed with a similar run in the absence of sulfur in which the catalyst deactivates at a rate substantially greater than 25° F./b.p.p. Accordingly, the process of the present invention decreases the catalyst deactivation rate in this case by a factor of 5, while simultaneously achieving and maintaining a high $C_5+$ yield.

EXAMPLE V

Another long term stability test was performed on a blended naphtha charge stock having the properties shown in Table IX. The catalyst utilized and the flow scheme of the pilot plant were substantially identical to those described in Example IV.

TABLE IX.—ANALYSIS OF BLENDED NAPHTHA

Gravity, ° API at 60° F. _____ 52.7
Engler distillation:
  IBP, ° F. _____ 213
  10% _____ 228
  30% _____ 243
  50% _____ 260
  70% _____ 286
  90% _____ 327
  EBP ° F. _____ 367
Water, wt. p.p.m. _____ 2.8
Sulfur, wt. p.p.m. _____ <1
Paraffins, vol. percent _____ 32.6
Aromatics, vol. percent _____ 9.4
Naphthenes, vol. percent _____ 58.0
Octane No., F–1 clear _____ 65.8

Sulfur in the form of tertiary heptyl mercaptan was added to the charge stock in an amount of 200 wt. p.p.m. which, as previously explained in Example IV, with hydrogen recycle and no scrubbing of $H_2S$ therefrom, corresponds to an amount of sulfur entering the reforming zone of about 1000 wt. p.p.m., based on weight of naphtha charged.

The run was conducted at a pressure of 200 p.s.i.g., a LHSV of 1.0 hr.$^{-1}$, a hydrogen to hydrocarbon mole ratio of about 8.5:1, and a conversion temperature sufficient to yield a $C_5+$ product stream of 102 F–1 clear. Moreover, the run was cut to a catalyst life of 8.85 b.p.p., where the run was shut down because the stability of the run was manifest and no further data was needed as in Example IV, the run would have been continued for a substantial additional period of catalyst life if desired—indicated catalyst life was about 35 b.p.p.

Results for this run are given in Table X.

TABLE X.—RESULTS OF STABILITY TEST FOR STRAIGHT-RUN NAPHTHA

| | Yields 1.0 b.p.p. | Average yield | Change in yield/b.p.p. |
|---|---|---|---|
| $H_2$, s.c.f.b | 1,547 | 1,509 | −10.2 |
| Aromatics, LV percent | 63.0 | 62.5 | −0.13 |
| $C_5+$, LV percent | 82.7 | 81.8 | −0.31 |
| $C_3+C_4$, wt. percent | 4.2 | 5.0 | +0.26 |
| $C_1+C_2$, wt. percent | 3.25 | 3.7 | +0.14 |

From Table X, it can be seen that the run demonstrated excellent yield stability. Moreover, the average temperature deactivation rate between 1.0 b.p.p. and 8.85 b.p.p. was 1.67° F. F./b.p.p. which is indicative of the remarkable stability of the process of the present invention.

EXAMPLE VI

A stability test was conducted with the straight-run naphtha described in Example IV using a reforming catalyst substantially identical to that described in Example I.

Conditions utilized were: a pressure of 300 p.s.i.g., a LHSV of 2.0 hr.$^{-1}$, a hydrogen to hydrocarbon mole ratio of 8.5:1 and a temperature continuously selected to make a $C_5+$ product of 100 F–1 clear.

Once again the plant was maintained substantially water-free and sulfur was continuously entering the reforming zone in an amount corresponding to 1000 p.p.m. based on weight of the naphtha feed.

The run was made for a period corresponding to a catalyst life of 12 b.p.p. with the results shown in Table XI.

TABLE XI.—RESULTS OF STABILITY TEST

| | Yields 1.0 b.p.p. | Average yield | Change in yield/b.p.p. |
|---|---|---|---|
| $C_1+C_2$, wt. percent | 5.5 | 6.3 | +0.16 |
| $C_3+C_4$, wt. percent | 7.4 | 8.8 | +0.28 |
| $C_5+$, LV percent | 77.9 | 76.4 | −0.32 |
| Aromatics, LV percent | 55.0 | 53.0 | −0.40 |
| $H_2$, s.c.f.b | 1,440 | 1,290 | −30 |

From Table XI, the yield stability of the process of the present invention is manifest; moreover, the average deactivation rate over the catalyst life of 12 b.p.p. for this run was 1.9° F./b.p.p. which is, once again, indicative of the stability feature of the present invention.

I claim as my invention:

1. A catalytic, low pressure process for continuously reforming a hydrocarbon charge stock boiling in the gasoline range for a catalyst life of at least 15 barrels of charge per pound of catalyst without catalyst regeneration, said process comprising continuously contacting, in a substantially water-free reforming zone, the hydrocarbon charge stock, hydrogen and sulfur or a sulfur-containing compound with a reforming catalyst containing a platinum group component at reforming conditions including a pressure of about 50 to about 350 p.s.i.g., said sulfur or sulfur-containing compound being continuously introduced into said reforming zone both during start-up of the process and thereafter for the duration of the reforming run, in an amount, calculated as elemental sulfur, equivalent to about 300 to about 3000 weight p.p.m. of the hydrocarbon charge stock, said amount being established during and not being increased after start-up of the process.

2. The process of claim 1 wherein at least a portion of said sulfur or sulfur-containing compound enters the reforming zone in admixture with said hydrocarbon charge stock.

3. The process of claim 1 wherein at least a portion of said sulfur or sulfur-containing compound enters said reforming zone in said hydrogen.

4. The process of claim 1 wherein said sulfur-containing compound is a mercaptan.

5. The process of claim 1 wherein said reforming catalyst comprises a refractory inorganic oxide having combined therewith a platinum group component and a halogen component.

6. The process of claim 5 wherein said refractory inorganic oxide is alumina.

7. The process of claim 5 wherein said halogen component is chlorine or fluorine.

8. The process of claim 1 wherein said reforming catalyst comprises alumina having combined therewith about 0.01 to about 3.0 wt. percent platinum and about 0.1 to about 1.5 wt. percent chlorine.

9. The process of claim 1 wherein said reforming conditions include a liquid hourly space velocity of about .5 to about 15 hr.$^{-1}$, a temperature in the range of about 800° F. to about 1100° F. and a hydrogen to hydrocarbon mole ratio of about 0.5:1 to about 20:1.

10. The process of claim 1 wherein said sulfur or sulfur containing compound enters said reforming zone in an amount of about 500 to about 1500 wt. p.p.m. of said hydrocarbon charge stock.

References Cited
UNITED STATES PATENTS

| | | | |
|---|---|---|---|
| 2,952,611 | 9/1960 | Haxton et al. | 208—65 |
| 3,006,841 | 10/1961 | Haensel | 208—165 |
| 3,067,130 | 12/1962 | Baldwin et al. | 208—138 |
| 3,201,343 | 8/1965 | Bicek | 208—138 |

HERBERT LEVINE, Primary Examiner

U.S. Cl. X.R.

208—139